United States Patent [19]

Parker

[11] Patent Number: 5,295,880
[45] Date of Patent: Mar. 22, 1994

[54] FLUSHING VALVE FOR INBOARD BOAT ENGINES

[75] Inventor: Marty E. Parker, Paso Robles, Calif.

[73] Assignee: Tuit International, Inc., Paso Robles, Calif.

[21] Appl. No.: 2,581

[22] Filed: Jan. 11, 1993

[51] Int. Cl.⁵ .................................... B63H 21/38
[52] U.S. Cl. ................................. 440/88; 440/113
[58] Field of Search ............ 440/88, 113; 134/168 R, 134/169 R, 166 R, 169 A; 114/183 R; 137/512, 523, 112

[56] References Cited

U.S. PATENT DOCUMENTS

| | | | |
|---|---|---|---|
| 23,487 | 4/1952 | McCabe, Jr. | 137/523 X |
| 852,185 | 4/1907 | Lockwood | 137/523 X |
| 1,200,623 | 10/1916 | Kraft | 137/523 X |
| 3,316,932 | 5/1967 | Schmitt | 137/512 |
| 3,441,044 | 4/1969 | Rodriquez | 137/111 |
| 3,550,612 | 12/1970 | Maxon | 440/88 X |
| 4,619,618 | 10/1986 | Patti | 440/88 |
| 4,677,929 | 7/1987 | Harris | 440/88 |

*Primary Examiner*—Sherman Basinger
*Attorney, Agent, or Firm*—Daniel C. McKown

[57] ABSTRACT

The valve is inserted in the conduit that carries ambient water to the engine for cooling it. The valve has the form of a T or a Y. Cooling water enters port A against the urging of a first spring-loaded check valve and flows out through port B on route to the engine. The stiffness of the spring is carefully selected so that the first check valve functions as a flow restricter, whereby at low engine speeds the flow is reduced to prevent overcooling of the engine. When the boat is out of the water, flushing water or an antifreeze can be drawn in through port C which is provided with a second spring-loaded check valve. If the flushing water or antifreeze is supplied under pressure, the pressure must be great enough to overcome the urging of the second spring-loaded check valve. If the flushing water or antifreeze is to be supplied from an unpressurized source, a spoiler can be manually fitted into the second spring-loaded check valve to keep it unseated, whereby the unpressurized flushing water or antifreeze can enter port C unopposed.

9 Claims, 2 Drawing Sheets

5,295,880

FLUSHING VALVE FOR INBOARD BOAT ENGINES

BACKGROUND OF THE INVENTION

1. Field of the Invention

The present invention is in the field of nautical equipment, and specifically relates to a flushing valve that can be inserted into the cooling water supply conduit to permit flushing of the engine of a boat.

2. The Prior Art

A number of valves are known in the prior art for permitting the flushing of the cooling system of a boat engine; however, it is believed that none of the prior art inventions has the same structure as the present invention or is able to perform all of the functions made possible by the structure of the present invention.

The closest known prior art is believed to be U.S. Pat. No. 3,550,612 issued Dec. 29, 1970 to Maxon. Maxon shows a T-shaped device that has check valves in the intake legs and that is inserted into the conduit that carries lake water to the engine. The two intake legs are closed by check valves, but only the clean water intake is urged shut by a spring. The lake water inlet is provided with a ball check valve, but the ball is not spring-loaded against its seat. Instead, the ball has holes running through it, the purpose of which is to permit a pressurized supply of fresh water to back-flush the lake water supply conduit. It does not appear to be possible, with Maxon's valve, to draw non-pressurized cleaning water or antifreeze into the engine, because the perforated ball of the intake check valve would permit air to flow in through that valve, thereby destroying the desired suction.

In U.S. Pat. No. 4,789,367, Fulks shows a Y-shaped device that includes manually-operated valves in the intake legs. Fulks' device does not use check valves, and the need for manual operation distinguishes it from the present invention.

In U.S. Pat. No. 5,038,724, Neal, et al. teach the concept of controlling the engine temperature by controlling the rate of fluid flow through the engine. This same teaching is also found in U.S. Pat. No. 5,048,468 of Broughton, et al.

As will be seen below, the present invention has several features that in combination distinguish it from the valves of the prior art.

SUMMARY OF THE INVENTION

It is an object of the present invention to provide a flushing valve that serves to modulate the flow of engine cooling water in relation to the speed of the engine, so as not to overcool the engine at low speeds.

It is a further object of the present invention to provide a way by which a flushing liquid can be run through the engine, regardless of whether the source of flushing fluid is pressurized or unpressurized. A garden hose connected to a domestic water supply is an example of a pressurized source, while a bucket of the flushing liquid is an example of an unpressurized source.

It is a further object of the present invention to provide a flushing valve the body of which is composed of a transparent material so that the operation of the valve can be readily monitored, considering that the cooling water intake, the valve, the source of flushing liquid, and the engine discharge port may not be visible, or may not be simultaneously visible.

In accordance with the present invention, there is provided a flushing valve in the form of a hollow body having a first port, a second port, and a third port. Within the hollow body a first biased check valve prevents outward flow through the first port and prevents inward flow through the first port until the outside pressure exceeds the inside pressure by a pressure difference $P_1$. As the pressure difference increases beyond $P_1$, the inward flow through the first port gradually increases in relation to the difference between the outside pressure and the inside pressure.

By outside pressure is meant the pressure of a liquid that is applied to a particular port, and by inside pressure is meant the pressure within the hollow body of the flushing valve.

Also within the hollow body of the flushing valve, a second biased check valve prevents outward flow through the second port and prevents inward flow through the second port until the outside pressure at the second port exceeds the inside pressure by a pressure difference $P_2$, where $P_2$ is greater than $P_1$.

The third port of the flushing valve is connected to a conduit that carries liquid from the flushing valve to the engine. The first port is connected to a conduit that leads to the cooling water intake and that conducts the cooling water to the flushing valve. Typically, the cooling water is taken from the body of water in which the vessel is floating, referred to herein as the ambient water.

The second port of the flushing valve is capped unless the engine is being flushed. In that case, the second port is connected to a supply of a flushing liquid, and that supply may or may not be pressurized.

These and other features of the flushing valve of the present invention will be described below in connection with the drawings. However, the drawings are for the purpose of illustration and explanation only and are not intended to define the limits of the invention.

DETAILED DESCRIPTION OF THE PREFERRED EMBODIMENT

Figure 1:
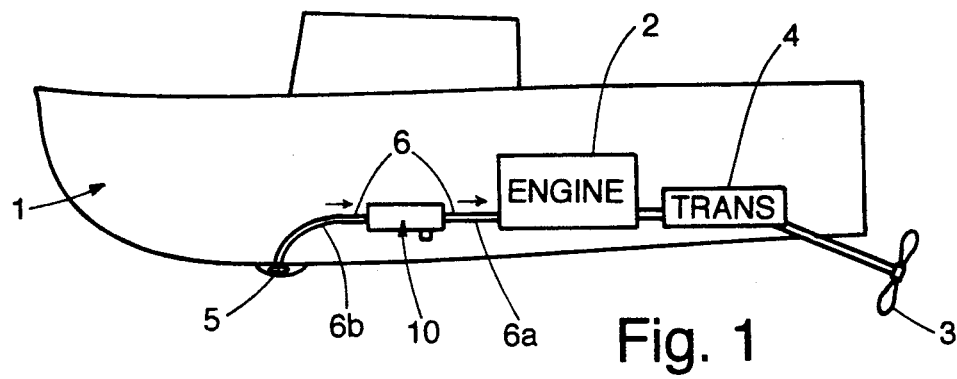
FIG. 1 is a diagram showing the flushing valve of the present invention inserted into the cooling water supply conduit for the engine of a boat.

The flushing valve 10 of the present invention is typically used on a boat 1 as indicated in FIG. 1. The boat is powered by an inboard engine 2 that drives a propeller 3 through a transmission 4. An impeller pump driven by the engine draws ambient water through the intake 5 and through the conduit 6 for the purpose of cooling the engine 2. The flushing valve of the present invention is installed by inserting it in the conduit 6.

The flushing valve of the present invention belongs to a class of devices which are referred to as flushing valves, but as will be seen below in connection with FIG. 2, the device actually consists of two valves that work together to permit several desirable results to be obtained.

Structure

Figure 2:
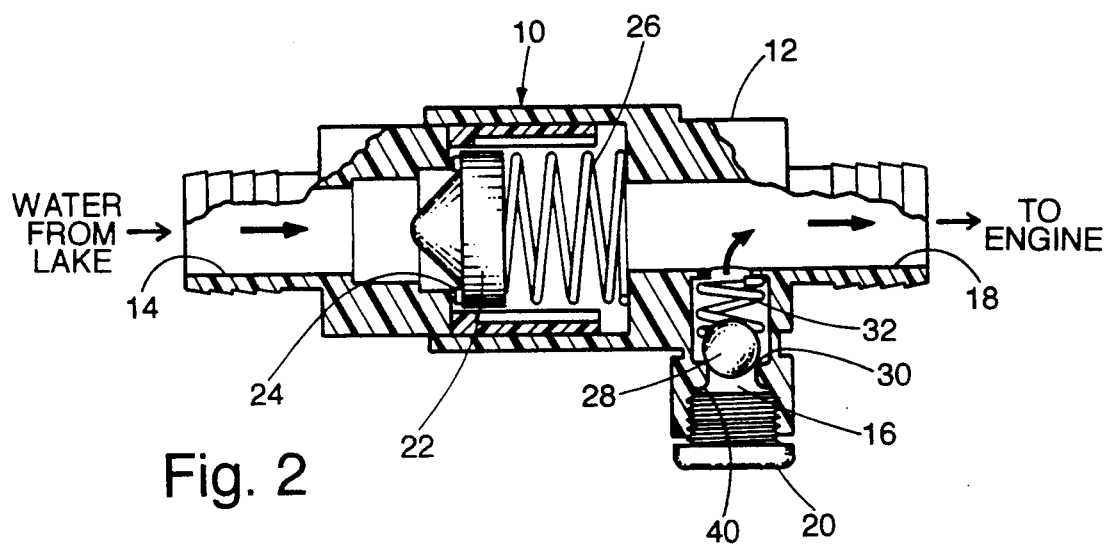
FIG. 2 is a side elevational view in cross section showing a preferred embodiment of the flushing valve of the present invention.

As seen in FIG. 2, the flushing valve 10 includes a hollow body 12. Three ports lead into the space within the hollow body. They are a first port 14, a second port 16, and a third port 18.

When the flushing valve 10 is installed, the conduit 6 of FIG. 1 is severed, and the portion 6a that goes to the engine 2 is connected to the third port 18. The portion 6b that leads to the intake 5 is connected to the first port 14. Until the flushing valve 10 is to be used for flushing the engine 2, the second port 16 is not used, and is sealed by a cap 20 to prevent extraneous matter from entering the valve 10 and through it the engine 2.

Mounted within the first port 14 and controlling the flow through the first port is a first check valve 22 that is urged against a valve seat 24 by a compression spring 26. In the preferred embodiment, the first valve 22 is provided with a protuberance that reduces turbulence and restricts flow through the first check valve. In the preferred embodiment, the spring 26 is composed of a stainless steel to prevent corrosion.

Figure 4:
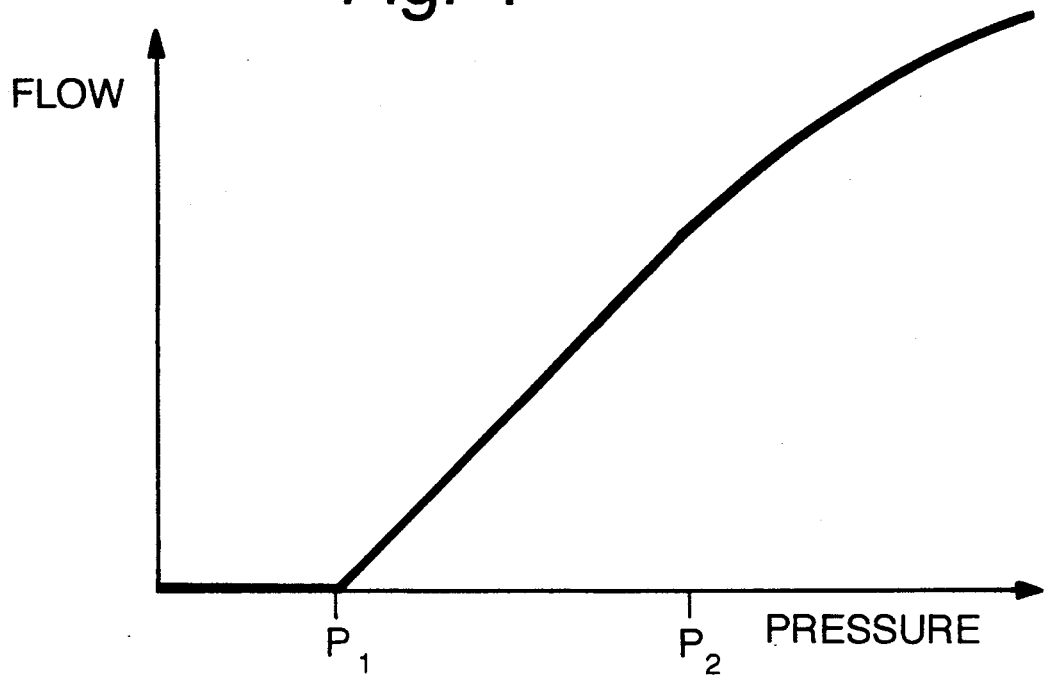
FIG. 4 is a graph showing how the flow through the first check valve varies with the difference in pressure across that valve; and, FIG. 5 is a graph showing how the flow through a second check valve varies with the difference in pressure across that valve.

FIG. 4 shows how the flow through the first check valve is related to the pressure difference across the valve, i.e., the difference between the pressure inside the hollow body 12 and the pressure applied to the first port 14. Until the pressure differential reaches a preset pressure $P_1$, no flow occurs. For pressures greater than $P_1$, the flow is roughly proportional to the differential pressure. This characteristic of the first check valve is important because it results in the flow of cooling water to the engine being related to the speed of the engine, and this avoids overcooling of the engine at low engine speeds. Overcooling would likely occur if the flushing valve 10 were not installed in the conduit 6. The significance of the pressure $P_1$ will be explained below.

The second port 16 is provided with a ball-type check valve, and includes a ball 28 that is urged against a valve seat 30 by a compression spring 32. In the preferred embodiment, the compression spring 32 is composed of a stainless steel to resist corrosion.

Figure 5:
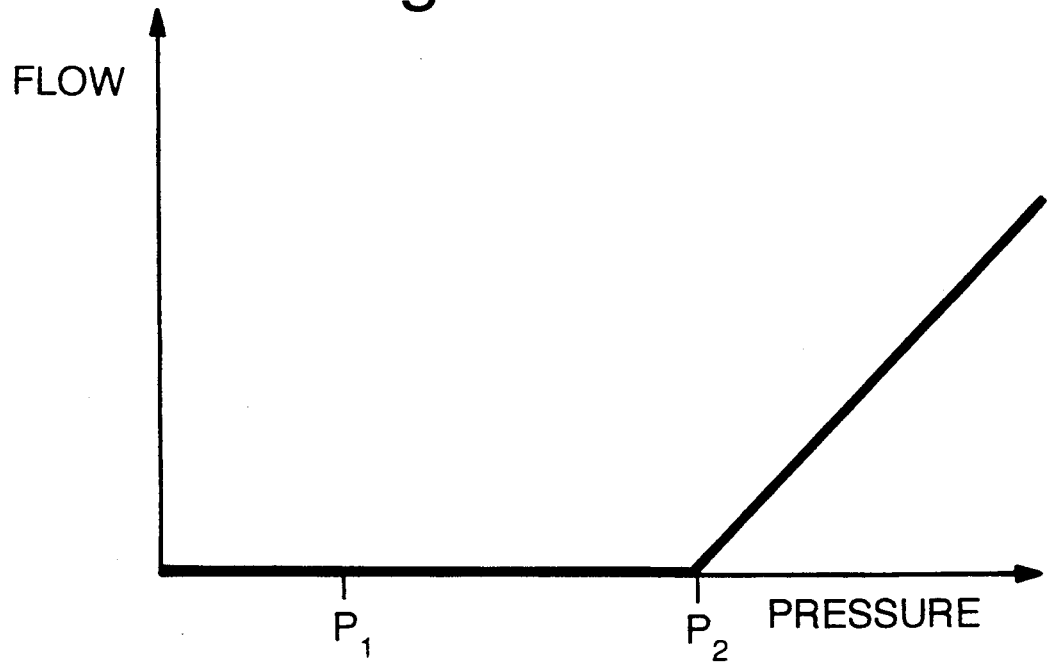

The relation between the flow through the second check valve and the pressure across it is shown in FIG. 5. The pressure across the valve is the difference between the pressure inside the hollow body 12 and the pressure applied to the second port 16. When that differential pressure is less than a preset amount $P_2$, no flow can occur through the second check valve. For pressures greater than $P_2$, the flow increases roughly linearly with the pressure. It is critical to the operation of the flushing valve that the pressure $P_2$ be greater than the pressure $P_1$.

Figure 3:
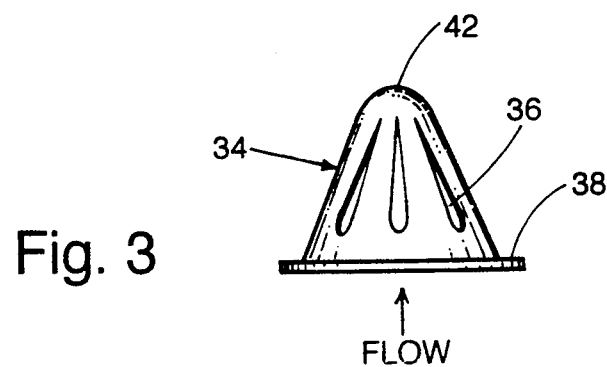
FIG. 3 is a side elevational view showing a spoiler used in connection with the flushing valve of the present invention.

FIG. 3 is drawn to a different scale from FIG. 2 and shows an enlarged view of a spoiler 34 that can be inserted into the second port 16 for the purpose of keeping the ball 28 unseated. The spoiler 34 is composed of a plastic in a preferred embodiment, and has the form of a thimble. The aperture 36 extends through the shell to permit liquid to flow through it, and the aperture 36 is typical of several apertures in the spoiler 34. The spoiler also includes a rim 38 that bears against the surface 40 to prevent further intrusion of the spoiler into the valve. The tip 42 of the spoiler contacts the ball 28 and keeps the ball from engaging its seat 30.

The body 12 of the flushing valve is composed of a clear plastic that permits the user to observe conditions within the flushing valve. This feature is highly advantageous because normally it is difficult if not impossible otherwise to learn what is happening in the operation of the cooling system.

Operation

The flushing valve of the present invention has three modes of operation. In the first mode of operation the flushing valve serves to modulate the supply of cooling water flowing to the engine. In this mode of operation, when the engine is started, its impeller pump draws water from the body of water in which the boat 1 is floating through the intake 5, the conduit 6b, the first port 14, the third port 18, and the conduit 6a to the engine 2. The suction developed by the impeller pump of the engine is slightly more than $P_1$, permitting the flushing valve to pass a relatively low flow of the cooling water to the engine. As the engine is speeded up, the suction developed by the impeller pump increases, causing the pressure across the first check valve to increase, and thereby increasing the flow of cooling water to the engine in accordance with FIG. 4. The pressures involved never exceed $P_2$, but instead are in the range of 0–10 psi, while $P_2$ is typically greater than 50 psi. Accordingly, during this first mode of operation, no liquid can enter the second port. In this mode of operation, the flushing valve of the present invention serves to regulate the flow of cooling liquid to the engine so that at low engine speeds the engine will not be overcooled.

In a second mode of operation, the boat has been dry-docked, and it is desired to flush the engine with clean water to eliminate various salts, chemicals and organic matter that may have been introduced to the engine through the cooling water. In this mode of operation, a source of pressurized clean water is connected to the second port. Typically, this source consists of a garden hose pressurized by the municipal water supply. After the cap 20 has been removed, the threaded end of the garden hose is screwed into the threaded interior of the second port, and the pressurized supply is applied to the second port. Since, $P_2$ was chosen to be less than the supply pressure, the supply pressure is sufficient to displace the ball 28 from its seat 30 and to permit the clean water to flow into the hollow body of the valve and out through the third port to the engine 2 for the purpose of flushing the engine. During this operation, the first check valve 22 is forced closed by the pressure of the water.

In a third mode of operation, it is possible to supply a flushing liquid from an unpressurized source to the engine. In this mode of operation, the boat is in dry-dock, and it is necessary to run the engine 2 so that the impeller pump can create a suction in the conduit 6a. After the cap 20 has been removed from the second port, the spoiler 34 of FIG. 3 is inserted into the second port 16 and thereafter one end of a length of hose is screwed into the threads of the second port 16. The other end of the length of hose is immersed in a flushing liquid in an open container such as a bucket or a barrel. Next, the engine is started up, and its impeller pump creates a suction in the conduit 6a. The suction generated by the impeller pump then draws the flushing liquid through the open check valve in the second port, and the liquid is drawn out through the third port to the engine.

Because the supply of flushing liquid is normally at about the same height as the flushing valve 10, the second check valve is, in effect, at atmospheric pressure, and accordingly, there is practically no pressure differential across the first check valve 22 which therefore remains closed. If the supply of flushing liquid is located much lower than the flushing valve 10, then there must be some suction in the interior of the flushing valve to lift the flushing liquid, and in this case a pressure differential will exist across the first check valve. If this pressure differential exceeds $P_1$, air will be drawn in through the first check valve in preference to the flushing liquid through the second check valve.

If the open container of flushing liquid were located ten feet below the flushing valve 10, then a negative pressure or suction of 4.3 psi would be present inside the hollow body of the flushing valve, assuming the flushing liquid has the density of water. However, the pressure $P_1$ is on the order of 10 psi, and therefore even in this situation no air is admitted through the first check valve.

The flushing liquid may be clean water, or it could be an antifreeze solution, or possibly a cleaning solution.

In a first alternative embodiment the valve body is provided with a fourth port that is sealed except when it is connected to an unpressurized source of flushing liquid. The spoiler 34 is not used, and the second port is used only for pressurized flushing liquid.

In a second alternative embodiment, the flushing valve is provided with a manually controlled bypass around the second check valve. The bypass is closed except when an unpressurized source of flushing liquid is connected to the second port.

Thus, there has been described a flushing valve for a boat engine that is capable of using either a pressurized supply of flushing liquid or an unpressurized supply of flushing liquid.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A flushing valve for an inboard boat engine that is installed in a conduit normally used for conducting ambient water to the engine for cooling it, said flushing valve comprising in combination:
   a hollow body including a first port, a second port, and a third port;
   said hollow body containing a first biased check valve preventing outward flow through said first port and preventing inward flow through said first port until the outside pressure exceeds the inside pressure by $P_1$, and permitting inward flow in relation to the difference between the outside pressure and the inside pressure when the outside pressure exceeds the inside pressure by at least $P_1$, whereby the flow of ambient water to the engine is modulated in relation to the engine speed to avoid overcooling the engine at low speeds;
   said hollow body containing a second biased check valve preventing outward flow through said second port and preventing inward flow through said second port until the outside pressure exceeds the inside pressure by $P_2$ where $P_2$ is greater than $P_1$;
   first means for connecting said first port to the conduit for receiving the ambient water;
   second means for removably connecting said second port to a supply of a flushing fluid; and,
   third means for connecting said third port to the conduit for discharging liquid from said third port to the engine.

2. The flushing valve of claim 1 wherein said hollow body is composed of a transparent material, whereby the operation of the flushing valve can be monitored.

3. The flushing valve of claim 1 wherein $P_1$ is less than 10 psi.

4. The flushing valve of claim 1 wherein $P_2$ is greater than 50 psi.

5. A flushing valve for an inboard boat engine that is installed in a conduit normally used for conducting ambient water to the engine for cooling it, and that can selectively supply flushing liquid to the engine from a pressurized source or from an unpressurized source, said flushing valve comprising in combination:
   a hollow body including a first port, a second port, and a third port;
   said hollow body containing a first biased check valve preventing outward flow through said first port and preventing inward flow through said first port until the outside pressure exceeds the inside pressure by $P_1$, and permitting inward flow in relation to the difference between the outside pressure and the inside pressure when the outside pressure exceeds the inside pressure by at least $P_1$, whereby the flow of ambient water to the engine is modulated in relation to the engine speed to avoid overcooling the engine at low speeds;
   said hollow body containing a second biased check valve preventing outward flow through said second port and preventing inward flow through said second port until the outside pressure exceeds the inside pressure by $P_2$ where $P_2$ is greater than $P_1$;
   first means for connecting said first port to the conduit for receiving the ambient water;
   second means for removably connecting said second port to a supply of a flushing fluid;
   third means for connecting said third port to the conduit for discharging liquid from said third port to the engine; and,
   spoiler means operatively associated with said second biased check valve for selectively holding open said biased check valve.

6. The flushing valve of claim 5 wherein said hollow body is composed of a transparent material, whereby the operation of the flushing valve can be monitored.

7. The flushing valve of claim 5 wherein $P_1$ is less than 10 psi.

8. The flushing valve of claim 5 wherein $P_2$ is greater than 50 psi.

9. The flushing valve of claim 5 wherein said spoiler means further include a unitary article insertable into said second port for preventing said second biased check valve from seating, when a flushing liquid from an unpressurized source is used.

* * * * *